US012256184B2

(12) United States Patent
Takubo

(10) Patent No.: US 12,256,184 B2
(45) Date of Patent: Mar. 18, 2025

(54) EARPIECE AND EARPHONE

(71) Applicant: Audio-Technica Corporation, Tokyo (JP)

(72) Inventor: Yosuke Takubo, Kanagawa (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 903 days.

(21) Appl. No.: 17/426,298

(22) PCT Filed: Jan. 29, 2020

(86) PCT No.: PCT/JP2020/003180
§ 371 (c)(1),
(2) Date: Jul. 28, 2021

(87) PCT Pub. No.: WO2020/158802
PCT Pub. Date: Aug. 6, 2020

(65) Prior Publication Data
US 2022/0109922 A1 Apr. 7, 2022

(30) Foreign Application Priority Data
Jan. 29, 2019 (JP) ................................ 2019-013432

(51) Int. Cl.
*H04R 1/10* (2006.01)
*H04R 1/34* (2006.01)

(52) U.S. Cl.
CPC ........... *H04R 1/1016* (2013.01); *H04R 1/345* (2013.01)

(58) Field of Classification Search
None
See application file for complete search history.

(56) References Cited

U.S. PATENT DOCUMENTS 6,513,621 B1 * 2/2003 Deslauriers .......... H04R 1/1016 128/865
8,831,266 B1 * 9/2014 Huang ................. H04R 1/2826 381/372
(Continued)

FOREIGN PATENT DOCUMENTS

EP 2701399 A1 2/2014
JP 2013-038756 A 2/2013
(Continued)

*Primary Examiner* — Nafiz E Hoque
(74) *Attorney, Agent, or Firm* — WC&F IP

(57) ABSTRACT

An earpiece whose inner cylinder is not crushed when the earpiece is inserted into an ear canal of a user is provided. An earpiece according to the present invention includes an inner cylinder 1 that includes one open end and the other open end and is attached to a sound conduit C of an earphone E, and an outer cylinder 2 connected to the one end of the inner cylinder and extending in an umbrella shape toward the other end of the inner cylinder so as to cover an outer surface 1*b* of the inner cylinder. The inner cylinder includes a fitting part 11 into which a tip of the sound conduit is fitted, and a sound guide part 12 configured to guide sound wave from the sound conduit to an ear canal. The sound guide part includes a constant diameter part 121 that has a constant inner diameter toward the one end side from the other end side and is disposed adjacent to the fitting part, and an expanded diameter part 122 that has an inner diameter continuously expanding toward one end side from the other end side and is disposed adjacent to the constant diameter part. The other end of the expanded diameter part is disposed closer to the other end side compared to a boundary B between an inner surface 2*a* of the outer cylinder and the outer surface of the inner cylinder in an axial direction orthogonal to a radial direction of the inner cylinder. The length between an inner surface 122*a* of the expanded diameter part and the outer surface of the inner cylinder in (Continued)

the radial direction of the expanded diameter part is the shortest at the boundary.

15 Claims, 5 Drawing Sheets

(56) References Cited

U.S. PATENT DOCUMENTS

| | | | | |
|---|---|---|---|---|
| 2009/0103764 | A1* | 4/2009 | Stiehl | B29C 45/0055 264/255 |
| 2013/0170692 | A1* | 7/2013 | Kaneko | H04R 1/1033 381/380 |
| 2017/0156932 | A1* | 6/2017 | Chae | A61F 2/0095 |

FOREIGN PATENT DOCUMENTS

| | | | |
|---|---|---|---|
| JP | 2015-056782 | A | 3/2015 |
| JP | 2015-061206 | A | 3/2015 |
| JP | 3218417 | U | 9/2018 |
| WO | 2012/144040 | A | 10/2012 |
| WO | 2014/041613 | A | 3/2014 |

* cited by examiner

EARPIECE AND EARPHONE

TECHNICAL FIELD

The present invention relates to an earpiece and an earphone.

BACKGROUND OF THE INVENTION

A canal-type earphone is one type of earphone. The canal-type earphone includes a housing, a sound conduit protruding from the housing, and an earpiece attached to a distal end side of the sound conduit. The housing accommodates a driver unit. The sound conduit guides sound wave from the driver unit to the outside of the housing. The earpiece is worn inside an ear canal of a user. The earpiece includes an inner cylinder and an outer cylinder. The inner cylinder allows the sound wave guided to the sound conduit to pass therethrough. The outer cylinder is in close contact with an inner wall of the ear canal.

The size and shape of the ear canal vary depending on users. Therefore, an earpiece that conforms to ear canals in various sizes and shapes are required.

An earpiece with an outer shape being easily deformable (crushed) and conformable to various sizes and shapes has been proposed (for example, see Japanese Publication of Unexamined Patent Application No. 2013-38756 and Japanese Publication of Registered Utility Model No. 3218417).

An earpiece disclosed in Japanese Publication of Unexamined Patent Application No. 2013-38756 includes an inner cylinder (hollow tubular body) and an outer cylinder (outer cover). The inner cylinder includes one or more tubular grooves. When the earpiece is inserted into the user's ear canal, the outer cylinder is crushed and the inner cylinder is bent (deflected) inwardly starting from the tubular groove.

An earpiece disclosed in Japanese Publication of Registered Utility Model No. 3218417 includes an inner cylinder (inner skin) and an outer cylinder (outer skin). The inner cylinder includes an expanded diameter part expanding toward a tip, and a step disposed between the expanded diameter part and an inner surface of the inner cylinder. A base of the expanded diameter part, i.e., the inner cylinder in which the step is located has thickness thinner than the thickness on its rear side in a radial direction. When the earpiece is inserted into the user's ear canal, the outer cylinder is crushed and the inner cylinder is bent (deflected) to the base of the expanded diameter part, i.e., the inside of the inner cylinder starting from the step.

As described above, when the earpiece disclosed in Japanese Publication of Unexamined Patent Application No. 2013-38756 and Japanese Publication of Registered Utility Model No. 3218417 is inserted into the user's ear canal, the entire earpiece including the tip side of the inner cylinder is bent toward the inner side (central axis) of the inner cylinder. That is, the inner diameter on the tip side of the earpiece, particularly, the inner diameter on the tip side of the inner cylinder after the earpiece is inserted into the user's ear canal is reduced comparing to the inner diameter on the tip side of the inner cylinder before the earpiece is inserted into the user's ear canal. That is, travel of the sound wave guided to the sound conduit may be hindered by the inner cylinder having a reduced inner diameter. As a result, the sound quality of the sound wave guided to the ear canal may be affected.

SUMMARY OF INVENTION

Technical Problem

An object of the present invention is to provide an earpiece and an earphone having a structure in which travel of sound wave guided to a sound conduit is hindered by an inner cylinder when the earphone is inserted into an ear canal of a user.

Solution to Problem

An earpiece according to the present invention includes an inner cylinder that includes one open end and the other open end and is attached to a sound conduit of an earphone, and an outer cylinder connected to the one end of the inner cylinder and extending in an umbrella shape toward the other end of the inner cylinder so as to cover an outer surface of the inner cylinder. The inner cylinder includes a fitting part into which a tip of the sound conduit is fitted, and a sound guide part configured to guide sound wave from the sound conduit to an ear canal. The sound guide part includes a constant diameter part that has a constant inner diameter toward the one end side from the other end side and is disposed adjacent to the fitting part, and an expanded diameter part that has an inner diameter continuously expanding toward one end side from the other end side and is disposed adjacent to the constant diameter part. The other end of the expanded diameter part is disposed closer to the other end side compared to a boundary between an inner surface of the outer cylinder and the outer surface of the inner cylinder in an axial direction orthogonal to a radial direction of the inner cylinder. The length between an inner surface of the expanded diameter part and the outer surface of the inner cylinder in the radial direction of the expanded diameter part is the shortest at the boundary.

Advantageous Effects of Invention

When the earpiece according to the present invention is inserted into the user's ear canal, the travel of the sound wave guided to the sound conduit is not hindered by the inner cylinder.

DESCRIPTION OF EMBODIMENTS

Exemplary embodiments of an earpiece and an earphone according to the present invention will now be described with reference to the drawings.

Earphone

Figure 1:
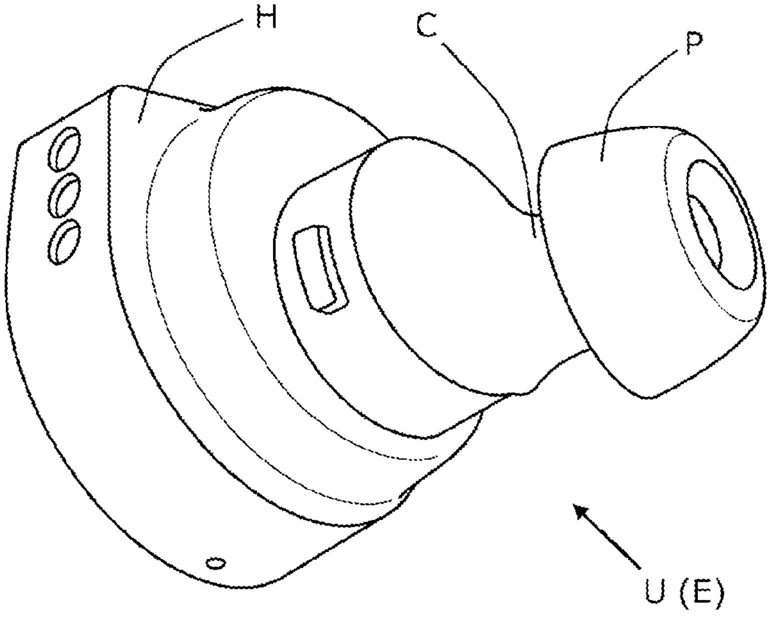
FIG. 1 is a perspective view showing an embodiment of an earphone according to the present invention.

FIG. 1 is a perspective view illustrating an embodiment of an earphone according to the present invention. The earphone E includes a sound emission unit U for a left ear and a sound emission unit (not shown) for a right ear. FIG. 1 shows only the sound emission unit U for the left ear. The configuration of the sound emission unit for the right ear is common to the configuration of the sound emission unit for the left ear.

Note that FIG. 1 shows a so-called complete wireless canal-type earphone in which a pair of left and right sound emission units (the sound emission unit for the left ear and the sound emission unit for the right ear) is not connected by a cord. However, the earphone according to the present invention is not limited to the complete wireless canal-type earphone, and may be, for example, a canal-type earphone in which a pair of left and right sound emission units is connected by a cord.

Hereinafter, the sound emission unit for the left ear will be described as an example.

The sound emission unit U includes a housing H, a sound conduit C, and an earpiece P. The earpiece P is an earpiece according to the present invention.

The housing H accommodates a driver unit (not shown). The driver unit is configured to convert sound signal (electrical signal) from a sound source (not shown) into sound wave, and to output the sound wave corresponding to the sound signal.

The sound conduit C is configured to guide the sound wave output from the driver unit to an outside of the housing H. The sound conduit C protrudes from the housing H. The sound conduit C is configured to guide the sound wave output from the driver unit to the ear canal in a state (hereinafter referred to as a "worn state") in which the earphone E is worn on an ear of a user.

The earpiece P is worn inside an ear canal of the user. The earpiece P is attached to a tip of the sound conduit C (not shown). The earpiece P is made of, for example, a resin such as silicone rubber having elasticity.

Earpiece (1)

Figure 2:
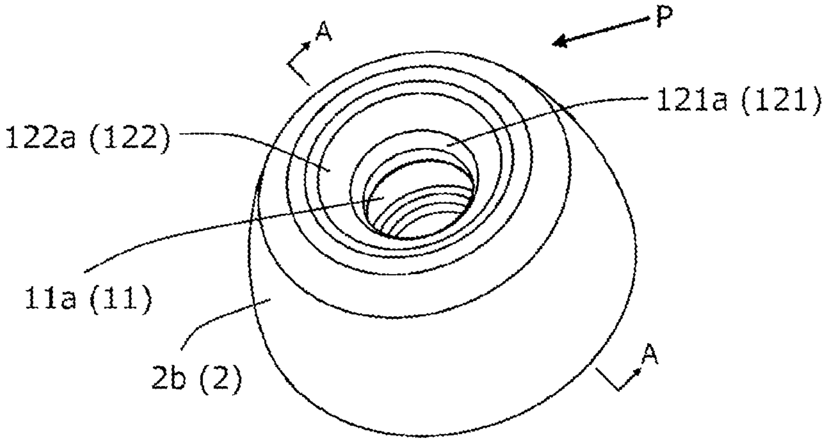
FIG. 2 is a perspective view showing an embodiment of an earpiece according to the present invention.

FIG. 2 is a perspective view showing an embodiment of the earpiece according to the present invention.

Figure 3:
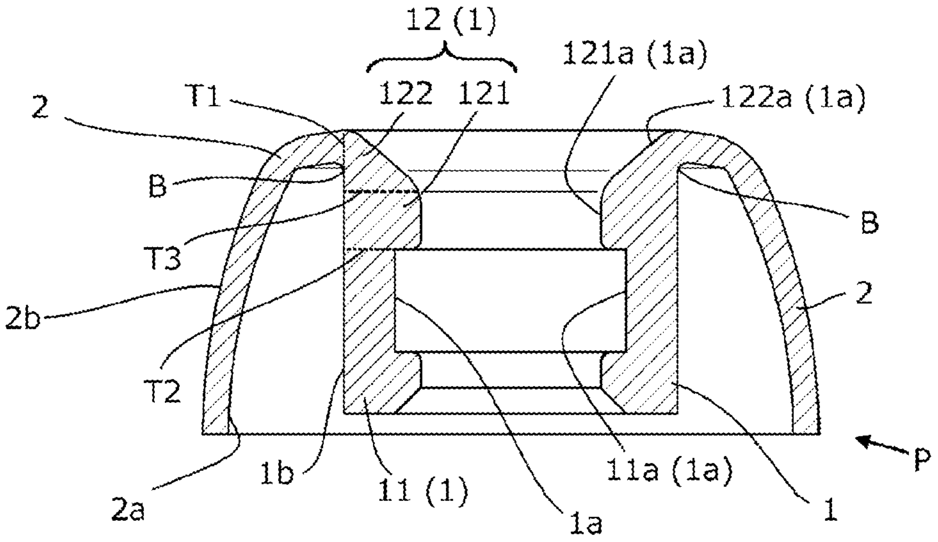
FIG. 3 is a cross-sectional view of the earpiece taken along line A-A in FIG. 2.
Figure 4:
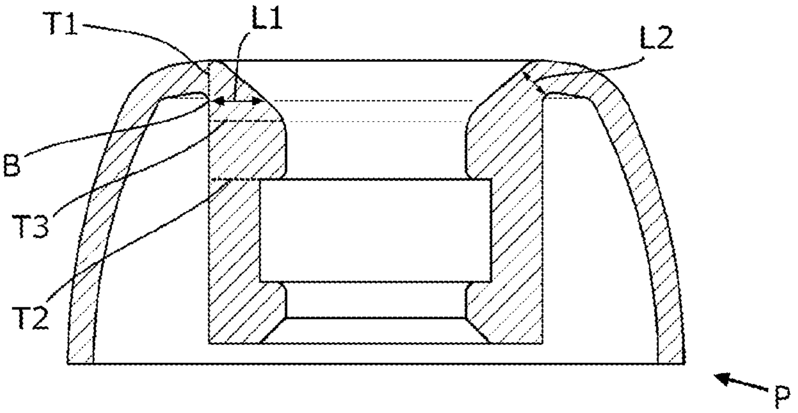
FIG. 4 is a cross-sectional view of the earpiece taken along line A-A in FIG. 2.

FIGS. 3 and 4 are a cross-sectional view taken along line A-A in FIG. 2.

The earpiece P includes an inner cylinder 1 and an outer cylinder 2. A broken line T1 shows a boundary between the inner cylinder 1 and the outer cylinder 2.

The inner cylinder 1 is attached to the sound conduit C (see FIG. 1). The inner cylinder 1 is configured to guide the sound wave guided to the sound conduit C from the driver unit to the outside of the earpiece P (the ear canal of the user). A specific configuration of the inner cylinder 1 will be described below.

The outer cylinder 2 is connected to the inner cylinder 1 at one end (the upper side in FIG. 3). The outer cylinder 2 covers the outer surface (the below-described outer surface 1*b*) of the inner cylinder 1. The outer cylinder 2 is in close contact with an inner wall of the user's ear canal in the worn state. The specific configuration of the outer cylinder 2 will be described below.

Configuration of Inner Cylinder

The inner cylinder 1 includes an inner surface 1*a*, an outer surface 1*b*, a fitting part 11, and a sound guide part 12. A broken line T2 shows a boundary between the fitting part 11 and the sound guide part 12. The inner cylinder 1 has a substantially cylindrical shape with one open end (the upper side end in FIG. 3) and another open end (the lower side end in FIG. 3).

The inner surface 1*a* is connected to the below-described outer surface 2*b* of the outer cylinder 2 at the one end side. The inner surface 1*a* is an inner periphery surface from the one end to the other end of the inner cylinder 1. The outer surface 1*b* is connected to the below-described inner surface 2*a* of the outer cylinder 2 on the one end side. The outer surface 1*b* is an outer peripheral surface from the other end of the inner cylinder 1 to the below-described boundary B.

The fitting part 11 is fitted to the tip of the sound conduit C (see FIG. 1). The fitting part 11 is disposed on the other end side of the inner cylinder 1. The fitting part 11 includes an inner surface 11*a*. The inner surface 11*a* is in close contact with an outer surface of the sound conduit C.

The sound guide part 12 guides the sound wave guided to the sound conduit C from the driver unit to the user's ear canal in the worn state. The sound guide part 12 is disposed adjacent to the fitting part 11 on the one end side of the inner cylinder 1.

The sound guide part 12 includes a constant diameter part 121 and an expanded diameter part 122. A broken line T3 shows the boundary between the constant diameter part 121 and the expanded diameter part 122.

The constant diameter part 121 is disposed adjacent to the one end of the fitting part 11. The constant diameter part 121 includes an inner surface 121*a*. The inner diameter of the constant diameter part 121 is constant toward one end from the other end. The inner diameter of the constant diameter part 121 is smaller than the inner diameter of the fitting part 11. Therefore, a step is disposed between the inner surface 121*a* of the constant diameter part 121 and the inner surface 11*a* of the fitting part 11.

The expanded diameter part 122 is disposed adjacent to the one end of the constant diameter part 121. The inner diameter of the expanded diameter part 122 is continuously expands toward the one end side from the other end side. The expanded diameter part 122 includes an inner surface 122*a*. The inner surface 122*a* is, for example, an inclined surface continuously inclined toward one end from the other end. The inclined surface is, for example, a straight surface that is continuously inclined to the one end from the other end of the inner surface 122*a*.

Note that the inner surface of the expanded diameter part is not limited to a straight surface. That is, for example, the inner surface of the expanded diameter part can be an arcuate surface as long as the inner diameter of the surface continuously expands toward one end from the other end.

The inner surface 11*a* of the fitting part 11, the inner surface 121*a* of the constant diameter part 121, and the inner surface 122*a* of the expanded diameter part 122 constitute the inner surface 1*a* of the inner cylinder 1.

Configuration of Outer Cylinder (1)

The outer cylinder 2 includes the inner surface 2*a* and the outer surface 2*b*. The inner surface 2*a* is connected to the outer surface 1*b* of the inner cylinder 1 at one end side, as described above. The outer surface 2*b* is connected to the inner surface 1*a* of the inner cylinder 1 at one end side, as described above. The other end side of the outer cylinder 2 extends toward the other end side of the inner cylinder 1 in an umbrella shape. The outer surface 2*b* is in close contact with the inner wall of the user's ear canal in the worn state. The outer surface 2*b* is deformed (crushed) when the earpiece P is inserted into the user's ear canal.

Note that the outer cylinder may be integrally formed with the inner cylinder, or may be formed separately from the inner cylinder.

Configuration of Earpiece (1)

FIG. 4 shows the length between each part of the earpiece P.

The boundary between the inner surface 2*a* of the outer cylinder 2 and the outer surface 1*b* of the inner cylinder 1 constitutes the boundary B. The boundary B is an annular boundary line. The other end of the expanded diameter part 122 of the inner cylinder 1 (the one end of the constant diameter part 121) shown with the broken line T3 is located (disposed) closer to the other end side compared to the boundary B in the axial direction of the inner cylinder 1 (the vertical direction in FIG. 4).

The length (L1) of the expanded diameter part 122 (inner cylinder 1) in a radial direction (left-right direction in the drawing), that is, the length between the inner surface 122*a* of the expanded diameter part 122 and the outer surface 1*b* of the inner cylinder 1 is the shortest at the boundary B among positions on the outer surface 1*b* in the axial direction.

The length L2 between the inner surface 122*a* and the boundary B in a perpendicular direction of the inner surface 122*a* of the expanded diameter part 122 is shorter than the length between the inner surface 1*a* and the outer surface 1*b* of the inner cylinder 1 in the radial direction.

Note that when the inner surface of the expanded diameter part is an arcuate surface, the length between the inner surface of the expanded diameter part and the boundary B in the normal line is shorter than the length between the inner surface and the outer surface of the inner cylinder in the radial direction.

Deformation of Earpiece (1)

The deformation of the earpiece P when the earphone E (see FIG. 1) is worn in the user's ear canal will now be described.

Figure 5:
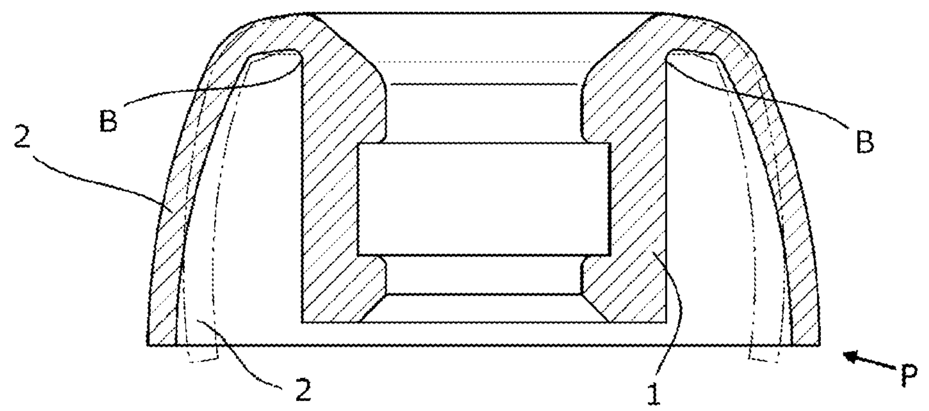
FIG. 5 is a cross-sectional view showing a state in which an outer cylinder of the earpiece in FIG. 2 is deformed.

FIG. 5 is a cross-sectional view showing a state in which the earpiece P is deformed.

FIG. 5 shows a state in which the outer cylinder 2 is deflected to the inner cylinder 1 side starting from the boundary B and the diameter of the outer cylinder 2 is reduced. A two dotted chain line in FIG. 5 shows the outer cylinder 2 reduced in diameter from being deflected to the inner cylinder 1 side starting from the boundary B.

When the earpiece P is inserted into the user's ear canal, the outer cylinder 2 is inserted into the user's ear canal in a state of being bent toward the central axis of the inner cylinder 1, since the earpiece P has elasticity. The outer cylinder 2 is deformed to conform to the shape of the inner wall of the ear canal. In this state, stress is likely to be applied to the one end of the outer cylinder 2 of the earpiece P. As described above, the length L1 of the expanded diameter part 122 (inner cylinder 1) in the radial direction is the shortest at the boundary B. The length L2 between the inner surface 122*a* and the boundary B in the perpendicular direction is shorter than the length between the inner surface 1*a* and the outer surface 1*b* of the inner cylinder 1 in the radial direction. Further, the length L2 is the shortest in the length between the inner surface 122*a* of the expanded diameter part 122 and the outer surface 1*b* of the inner cylinder 1. In other words, the thickness between the inner surface 122*a* of the expanded diameter part 122 and the outer surface 1*b* of the inner cylinder 1 is the thinnest at the boundary B in the inner cylinder 1.

Thus, the outer cylinder 2 is deflected starting from the boundary B. Therefore, when the earpiece P is inserted into the ear canal, the outer cylinder 2 is deflected starting from the boundary B. That is, the diameter of the outer cylinder 2 is reduced.

Further, when the earpiece P is inserted into the ear canal, the tip of the expanded diameter part 122 of the inner cylinder 1 may be deflected starting from the boundary B depending on the size of the user's ear canal. However, as described above, the inner diameter of the expanded diameter part 122 is expanded toward the one end side from the other end side. Therefore, even though the tip of the expanded diameter part 122 (the end on the one end side) is deflected, the expanded diameter part 122 is not deflected to the inner side (center side) from the constant diameter part 121 of the inner cylinder 1.

On the other hand, when the earpiece P is inserted into the ear canal, the constant diameter part 121 of the inner cylinder 1 is not deflected. Therefore, the inner diameter of the tip side of the inner cylinder 1, particularly, the inner diameter of the constant diameter part 121, before the earpiece P is inserted into the user's ear canal does not change from the inner diameter after the earpiece P is inserted into the user's ear canal. As a result, the sound quality of the sound wave guided to the ear canal is not affected.

Further, when the earpiece P is inserted into the ear canal, the outer diameter of the outer cylinder 2 becomes small. Accordingly, the earpiece P can be easily inserted into the ear canal. Moreover, the outer cylinder 2 tends to return to its original shape (its original diameter) when inserted into the ear canal, since the earpiece P has elasticity. Therefore, the earpiece P is firmly fixed in the user's ear canal. As a result, the earpiece P hardly falls out from the user's ear canal.

Conclusion (1)

According to the embodiment described above, the earpiece P includes the outer cylinder 2 deflected starting from the part of the boundary B, and the tip of the expanded diameter part 122 of the inner cylinder 1 deflected depending on the size of the user's ear canal. However, the expanded diameter part 122 is not deflected more to the inside of the constant diameter part 121 of the inner cylinder 1. On the other hand, the constant diameter part 121 of the inner cylinder 1 is not deflected. Therefore, the inner diameter of the constant diameter part 121 of the sound guide part 12 before the earpiece P is worn in the user's ear canal does not change from the inner diameter after the earpiece P is worn in the user's ear canal. That is, the sound quality of the sound wave guided to the sound conduit C and passing through the sound guide part 12 is not affected.

In addition, according to the embodiment described above, the earpiece P is deformed in the worn state such that the outer cylinder 2 conforms to the shape of the inner wall of the user's ear. On the other hand, the constant diameter part 121 of the inner cylinder 1 is not deformed in the worn state, and the sound quality of the sound wave passing through the sound guide part 12 is not affected. That is, the earpiece P prevents degradation in the sound quality while securing the attachability.

Note that the sound wave from the driver unit is repeatedly reflected in the sound conduit and the sound guide part and guided to the user's ear canal. The sound wave from the driver unit is attenuated by the reflection in the sound conduit and the sound guide part. As a result, in particular, the characteristic in the high frequency sound range is deteriorated. In the present embodiment, as described above, the sound guide part 12 includes the expanded diameter part 122, and the inner diameter of the expanded diameter part

122 is continuously expanded toward the one end side from the other end side. Therefore, the sound wave passing through the sound guide part 12, the degree and number of reflection in the expanded diameter part 122 is reduced. Therefore, the deterioration of the characteristic in the high frequency sound range due to the attenuation of the sound wave is suppressed.

Earpiece (2)

Another embodiment of the earpiece according to the present invention will now be described focusing on points different from the above-described embodiment (hereinafter referred to as "first embodiment").

The earpiece of the present embodiment (hereinafter referred to as "second embodiment") differs from the earpiece in the first embodiment in the presence or absence of an expanded diameter part and the below-mentioned groove. That is, the earpiece PX in the second embodiment does not include the expanded diameter part 122 included in the earpiece P in the first embodiment. The earpiece PX in the second embodiment includes the below-mentioned groove 14X.

Figure 6:
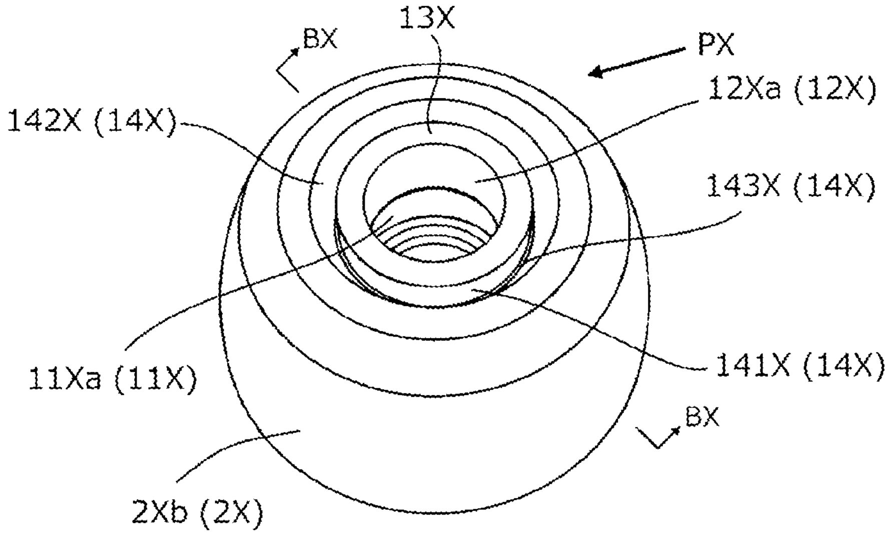
FIG. 6 is a perspective view showing another embodiment of the earpiece according to the present invention.

FIG. 6 is a perspective view showing another embodiment of the earpiece according to the present invention.

Figure 7:
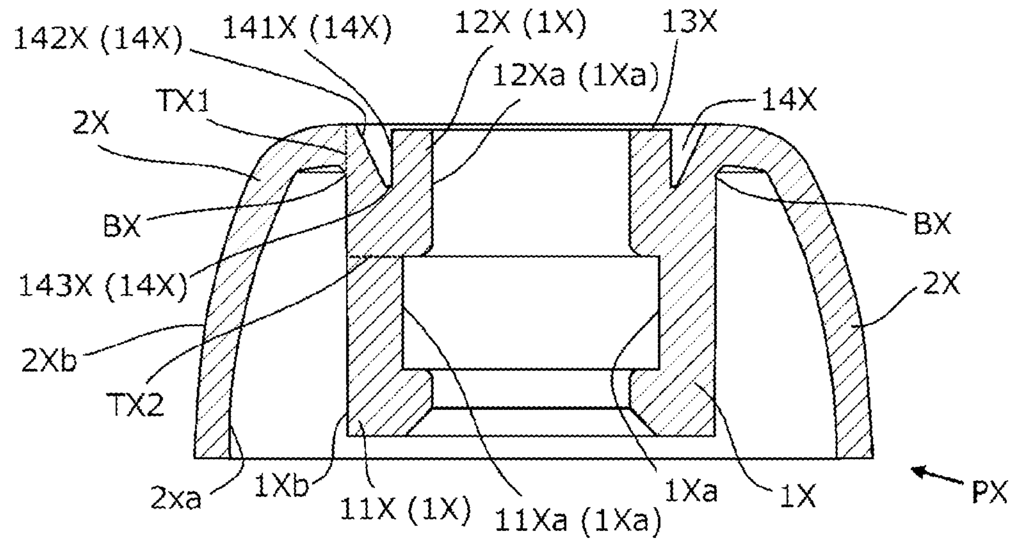
FIG. 7 is a cross-sectional view of the earpiece taken along line AX-AX in FIG. 6.
Figure 8:
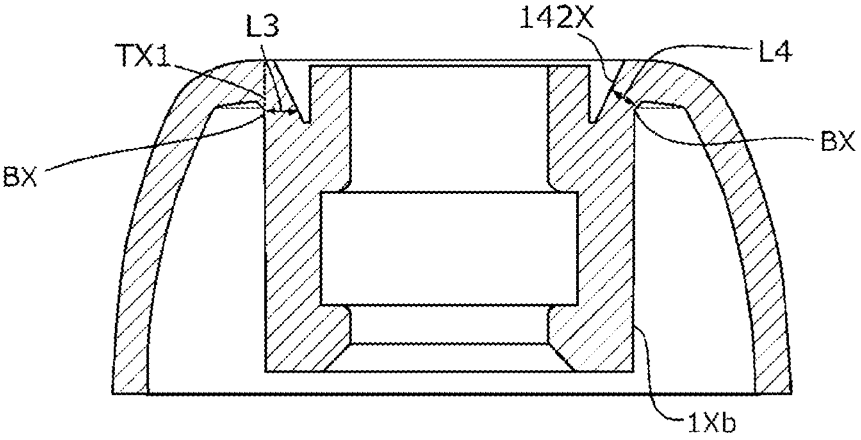
FIG. 8 is a cross-sectional view of the earpiece taken along line AX-AX in FIG. 6.

FIGS. 7 and 8 are a cross-sectional view taken along line AX-AX in FIG. 6.

The earpiece PX includes an inner cylinder 1X and an outer cylinder 2X. The broken line TX1 shows the boundary between the inner cylinder 1X and the outer cylinder 2X.

The inner cylinder 1X is attached to the sound conduit C (see FIG. 1). The inner cylinder 1X is configured to guide the sound wave guided to the sound conduit C to the outside of the earpiece PX (the user's ear canal) from the driver unit. The inner cylinder 1X has a substantially cylindrical shape with one open end (the upper side end in FIG. 7) and the other open end (the lower side end in FIG. 7). A specific configuration of the inner cylinder 1 will be described below.

The outer cylinder 2X is connected to the inner cylinder 1X at one end (the upper side in FIG. 7). The outer cylinder 2X covers the outer surface of the inner cylinder 1X (the below-mentioned outer surface 1Xb). The outer cylinder 2X is in close contact with the inner wall of the user's ear canal in the worn state. A specific configuration of the outer cylinder 2X will be described below.

Configuration of Inner Cylinder (2)

The inner cylinder 1X includes the inner surface 1Xa, the outer surface 1Xb, a fitting part 11X, a sound guide part 12X, the top surface 13X, and a groove 14X. The broken line TX2 shows the boundary between the fitting part 11X and the sound guide part 12X.

The inner surface 1Xa is an inner periphery surface from the one end to the other end of the inner cylinder 1X. The outer surface 1Xb is connected to the below-mentioned inner surface 2Xa of the outer cylinder 2X at the one end. The outer surface 1Xb is an outer periphery surface from the other end of the inner cylinder 1X to the below-described boundary BX.

The fitting part 11X is fitted to the tip of the sound conduit C (see FIG. 1). The fitting part 11X is disposed on the other end of the inner cylinder 1X. The fitting part 11X includes an inner surface 11Xa. The inner surface 11Xa is in close contact with the outer surface of the sound conduit C.

The sound guide part 12X guides the sound wave guided to the sound conduit C (see FIG. 1) to the user's ear canal from the driver unit, in the worn state. The sound guide part 12X is disposed adjacent to the fitting part 11X on the one end side of the inner cylinder 1X.

The sound guide part 12X has a cylindrical shape with a constant inner diameter. The inner diameter of the sound guiding part 12X is constant toward one end side from the other end side. The inner diameter of the sound guiding part 12X is smaller than the inner diameter of the fitting part 11X. Therefore, a step is disposed between the inner surface 12Xa of the sound guide part 12X and the inner surface 11Xa of the fitting part 11X.

Note that the sound guide part may include an expanded diameter part. That is, the sound guide part includes the constant diameter part and the expanded diameter part similarly to the first embodiment, for example. The constant diameter part is disposed adjacent to one end side of the fitting part. The expanded diameter part is disposed adjacent to one end side of the constant diameter part. The inner diameter of the expanded diameter part is continuously expanded toward one end side from the other end side.

Further, the sound guide part may include only an expanded inner diameter (only the expanded diameter part) not a constant inner diameter. That is, the sound guide part includes the expanded diameter part, for example. The expanded diameter part is disposed adjacent to the one end side of the fitting part. The inner diameter of the expanded diameter part is continuously expanded toward the one end side from the other end side.

The inner surface 11Xa of the fitting part 11X and the inner surface 12Xa of the sound guide part 12X constitute the inner surface 1Xa of the inner cylinder 1X.

The top surface 13X is an open end face on the one end side of the inner cylinder 1X.

The groove 14X is a substantially V-shaped groove in cross-section formed by notching a part of the top 13X. The groove 14X is a ring-shaped groove. The groove 14X is disposed concentrically with the inner surface 1Xa (the inner surface 11Xa and inner surface 12Xa) of the inner cylinder 1X. The groove 14X includes a first side surface 141X and a second side surface 142X.

The first side surface 141X is a plane surface parallel to the inner surface 12Xa of the sound guide part 12X. That is, the diameter of the first side surface 141X is a constant diameter.

The second side surface 142X is disposed outside the first side surface 141X, in the radial direction (the left and right direction in FIG. 7) of the inner cylinder 1X. The second side surface 142X is an inclined surface inclined outward toward the one end side from the other end side. The inclined surface, for example, a straight surface that is continuously inclined outward to the one end from the other end of the second side surface 142X.

Note that the second side surface is not limited to a straight surface. That is, for example, the second side surface can be an arcuate surface as long as the second side surface is a surface that continuously expands outward toward the one end side from the other end side.

The one end side of the second side surface may be located in the outer cylinder. In this case, the top surface is provided with a part of the outer surface of the outer cylinder.

The bottom 143X is disposed below in the axial direction (the vertical direction in FIG. 7) of the inner cylinder 1X. The bottom 143X is connected to each of the first side surface 141X and the second side surface 142X.

Note that the bottom may not be a surface. That is, for example, the bottom may be a boundary line between the first side surface and the second side surface.

Configuration of Outer Cylinder (2)

The outer cylinder 2X includes an inner surface 2Xa and an outer surface 2Xb. The inner surface 2Xa is connected to the outer surface 1Xb of the inner cylinder 1X at one end side. The outer surface 2Xb is connected to the second side surface 142X of the groove 14X at one end side as described above. The other end side of the outer cylinder 2X extends in an umbrella shape toward the other end side of the inner cylinder 1X. The outer surface 2Xb is in close contact with the inner wall of the user's ear canal in the worn state. The outer surface 2Xb is deformed (crushed) when the earpiece PX is inserted into the user's ear canal.

Note that the outer cylinder may be integrally formed with the inner cylinder, or may be formed separately from the inner cylinder.

Configuration of Earpiece (2)

FIG. 8 shows the length between each part of the earpiece PX.

The boundary between the inner surface 2Xa of the outer cylinder 2X and the outer surface 1Xb of the inner cylinder 1X constitutes a boundary BX. The boundary BX is an annular boundary line. The bottom 143X of the groove 14X is located (disposed) closer to the other end side compared to the boundary BX in the axial direction (the vertical direction in FIG. 8) of the inner cylinder 1X.

The radial length (L3) between the second side surface 142X and the outer surface 1Xb of the inner cylinder 1X in the radial direction is shorter than the length between the inner surface 1Xa and the outer surface 1Xb of the inner cylinder 1X in the radial direction of the inner cylinder 1X. Further, the length L3 at the boundary BX is the shortest in the length L3 of the outer surface 1Xb in the axial direction.

The length (L4) between the second side surface 142X and the boundary BX in the perpendicular direction of the second side surface 142X is shorter than the length between the second side surface 142X and the outer surface 1Xb of the inner cylinder 1X in the radial direction.

Note that when the second side surface is an arcuate surface, the length between the second side surface and the boundary in the normal direction of the second side is shorter than the length between the second side surface and the outer surface of the inner cylinder in the radial direction.

Deformation of Earpiece (2)

The deformation of the earpiece PX when the earphone E (see FIG. 1) is worn in the user's ear canal will now be described.

Figure 9:
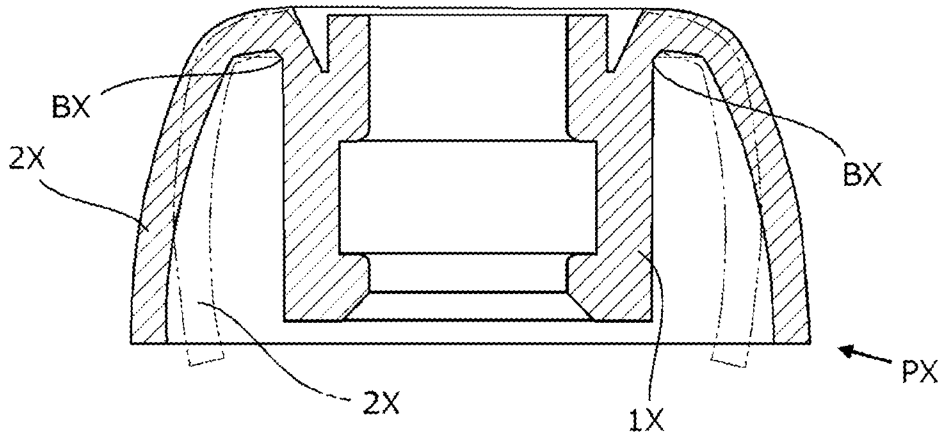
FIG. 9 is a cross-sectional view showing a state in which the outer cylinder of the earpiece in FIG. 6 is deformed.

FIG. 9 is a cross-sectional view showing a state in which the earpiece PX is deformed.

The FIG. 9 shows a state in which the diameter of the outer cylinder 2X is reduced, as the outer cylinder 2X is deflected to the inner cylinder 1X starting from the boundary BX. A two dotted chain line in the FIG. 9 shows the outer cylinder 2X reduced in diameter from being deflected to the inner cylinder 1X starting from the boundary BX.

When the earpiece P is inserted into the user's ear canal, the outer cylinder 2X is inserted into the user's ear canal in a state of being bent to the central axis of the inner cylinder 1X, since the earpiece P has elasticity. The outer cylinder 2X is deformed to conform the shape of the inner wall of the ear canal. In this state, stress is likely to be applied to the one end of the outer cylinder 2X of the earpiece PX. As described above, the length L3 between the second side surface 142X and the outer surface 1Xb of the inner cylinder 1X in the radial direction is shorter than the length between the inner surface 1Xa and the outer surface 1Xb of the inner cylinder 1X in the radial direction. Further, the length L3 at the boundary BX is the shortest in the length L3 of the outer surface 1Xb in the axial direction. Furthermore, the length L4 between the second side surface 142X and the boundary BX in the perpendicular direction of the second side surface 142X is shorter than the length between the second side surface 142X and the outer surface 1Xb of the inner cylinder 1X in the radial direction. Furthermore, the length L4 is the shortest in the length between the second side surface 142X and the outer surface 1Xb of the inner cylinder 1X. In other words, in the inner cylinder 1X, the thickness between the second side surface 142X and the outer surface 1Xb is the thinnest at the boundary BX.

Thus, the outer cylinder 2X is deflected starting from the boundary BX. Moreover, the groove 14X is disposed in the inner cylinder 1X. Therefore, when the earpiece PX is inserted into the ear canal, the outer cylinder 2 is deflected starting from the boundary BX. That is, the diameter of the outer cylinder 2 is reduced.

On the other hand, when the earpiece PX is inserted into the ear canal, the inside of the sound guide part 12X of the inner cylinder 1X from the groove 14X is not deflected, since groove 14X is disposed in the groove 1X. Therefore, the inner diameter of the sound guide part 12X before the earpiece PX is inserted into the user's ear canal does not change from the inner diameter after the earpiece PX is inserted into the user's ear canal. In other words, the inner diameter of the sound guide part 12X is not reduced even in the worn state. As a result, the sound quality of the sound wave guided to the ear canal is not affected.

Further, when the earpiece PX is inserted into the ear canal, the outer diameter of the outer cylinder 2X becomes small. Accordingly, the earpiece PX can be easily inserted into the ear canal. Moreover, since the earpiece PX has elasticity, the outer cylinder 2X tends to return to its original shape (its original diameter) when inserted into the ear canal. Therefore, the earpiece PX is firmly fixed in the user's ear canal. As a result, the earpiece PX hardly falls out from the user's ear canal.

Conclusion (2)

According to the earpiece PX in the second embodiment described above, the inside of the groove 14X of the inner cylinder 1X is not deflected, while the outer cylinder 2X is deflected starting from the boundary BX. Therefore, the inner diameter of the sound guide part 12 before the earpiece PX is worn in the user's ear canal does not change from the inner diameter after the earpiece PX is worn in the user's ear canal. That is, the sound quality of the sound wave guided to the sound conduit C and passing through the sound guide part 12X is not affected.

In addition, according to the second embodiment described above, the earpiece PX is deformed in the worn state such that the outer cylinder 2X conforms to the shape of the inner wall of the user's ear. On the other hand, the sound guide part 12X of the inner cylinder 1X is not deformed in the worn state. Accordingly, the sound quality of the sound wave passing through the sound guide part 12X is not affected. That is, the earpiece PX prevents degradation of the sound quality while securing the attachability.

Summary of Earpiece and Earphone

The configurational features of the earpiece and earphone according to the present invention described above will be summarized below.

(Feature 1)

An earpiece (e.g., the earpiece P), comprising:

an outer cylindrical body (e.g., the outer cylinder 2) to be inserted into the ear canal; and an inner cylindrical body (e.g., the inner cylinder 1) bent inwardly from a tip of the outer cylinder and attached to a unit case (e.g., the housing H) by covering a sound conduit (e.g., the sound conduit C), wherein the outer cylindrical body and the inner cylindrical body are integrally molded with an elastic material, and a thin part (e.g., the length L2 between the inner surface 122*a* of the expanded diameter part 122 and the boundary B in a perpendicular direction) is disposed at a tip bent part (e.g., the boundary B) between the outer cylindrical body and the inner cylindrical body.

(Feature 2)

The earpiece according to feature 1, wherein the thin part is continuously formed in an annular shape along the tip bending part.

(Feature 3)

The earpiece according to features 1 or 2, wherein the outer cylindrical body is formed with a shade-feature part which gradually increases in outer diameter from the tip bent part toward a tail end.

(Feature 4)

The earpiece according to any one of features 1 to 3, further comprising an annular V-shaped groove (e.g., the groove 14X) whose cross section in an axial direction is formed in a V-shape along the tip bent part, wherein the thin part (e.g., the length L4 between the second side surface 142X and the boundary BX in the perpendicular direction of the second side surface 142X) is formed between the V-shaped groove and a folded back surface of the tip bent part.

(Feature 5)

The earpiece according to any one of features 1 to 3, wherein a tapered opening (e.g., the expanded diameter part 122) which is reduced in an inner diameter from the tip bent part toward the inner cylindrical body is formed, and the thin part (e.g., the length L2 between the inner surface 122*a* of the expanded diameter part 122 and the boundary B in a perpendicular direction) is formed between the tapered opening and the folded back surface of the tip part.

(Feature 6)

The earpiece according to any one of features 1 to 3, wherein a cylindrical opening having the same inner diameter from the tip bent part toward the inner cylindrical body is formed, and the thin part is formed between the cylindrical opening and the folded back surface of the tip part.

(Feature 7)

An earphone (e.g., the earphone B), comprising:

an earpiece (e.g., the earphone P) of any one of features 1 to 6; and a unit case (e.g., the housing H) that accommodates at least a driver unit, wherein an inner cylindrical body (e.g., inner cylinder 1) of the earpiece is worn to cover a sound conduit (e.g., sound conduit C) formed in the unit case.

REFERENCE SIGNS LIST

E Earphone
U Sound emission unit
H Housing
C Sound conduit
P, PX Earpiece
B, BX Boundary
1, 1X Inner cylinder
1*a*, 1Xa Inner surface of inner cylinder
1*b*, 1Xb Outer surface of inner cylinder
11, 11X Fitting part
12, 12X Sound guide part
12Xa Inner surface of sound guide part
121, 121X Constant diameter part
121*a* Inner surface of constant diameter part
122 Expanded diameter part
122*a* Inner surface of expanded diameter part
13X Top surface
14X Groove
141X First side surface
142X Second side surface
143X Bottom
2, 2X Outer cylinder
2*a*, 2Xa Inner surface of outer cylinder
2*b*, 2Xb Outer surface of outer cylinder

The invention claimed is:

1. An earpiece, comprising:

an inner cylinder that includes one open end and the other open end and is attached to a sound conduit of an earphone; and an outer cylinder connected to the one end of the inner cylinder and extending in an umbrella shape toward the other end of the inner cylinder so as to cover an outer surface of the inner cylinder, wherein the inner cylinder includes:

a fitting part into which a tip of the sound conduit is fitted; and a sound guide part configured to guide sound wave from the sound conduit to an ear canal, the sound guide part includes:

a constant diameter part that has a constant inner diameter toward one end side from the other end side and is disposed adjacent to the fitting part; and an expanded diameter part that has an inner diameter continuously expanding toward one end side from the other end side and is disposed adjacent to the constant diameter part, the other end of the expanded diameter part is disposed closer to the other end side compared to a boundary between an inner surface of the outer cylinder and the outer surface of the inner cylinder in an axial direction orthogonal to a radial direction of the inner cylinder, the length between an inner surface of the expanded diameter part and the outer surface of the inner cylinder in the radial direction of the expanded diameter part is the shortest at the boundary, an outer diameter of the inner cylinder is constant toward the one end side from the other end side, and the outer cylinder includes:

an extension part extending from the outer surface of the inner cylinder in the radial direction of the inner cylinder; and a bent part bent from the extension part toward the other end side of the inner cylinder.

2. The earpiece according to claim 1, wherein the inner surface of the expanded diameter part is a straight surface, and the length between the inner surface of the expanded diameter part and the boundary in a perpendicular direction of the inner surface of the expanded diameter part is shorter than the length between the inner surface and the outer surface of the inner cylinder in the radial direction of the inner cylinder.

3. The earpiece according to claim 1, wherein the inner surface of the expanded diameter part is an arcuate surface, and the length between the inner surface of the expanded diameter part and the boundary in a normal direction of the inner surface of the expanded diameter part is shorter than the length between the inner surface and the outer surface of the inner cylinder in the radial direction of the inner cylinder.

4. An earpiece, comprising:

an inner cylinder that includes one open end and the other open end and is attached to a sound conduit of an earphone;

an outer cylinder connected to the one end of the inner cylinder and extending in an umbrella shape toward the other end of the inner cylinder so as to cover an outer surface of the inner cylinder;

a top surface formed with an open end surface on the one end side of the inner cylinder; and an annular groove disposed on the top surface, wherein the groove includes:

a first side surface;

a second side surface disposed outside the first side surface in a radial direction of the inner cylinder; and a bottom connected to the first side surface and the second side surface, wherein the bottom is disposed closer to the other end side compared to a boundary between the inner surface of the outer cylinder and the outer surface of the inner cylinder in an axial direction orthogonal to the radial direction of the inner cylinder, and the length between the second side surface and the outer surface of the inner cylinder is shorter than the length between the inner surface and the outer surface of the inner cylinder in the radial direction of the inner cylinder.

5. The earpiece according to claim 4, wherein the second side surface is an inclined surface inclined outward in the radial direction toward the one end side from the other end side.

6. The earpiece according to claim 4, wherein the inner cylinder includes a cylindrical sound guide part configured to guide sound wave from the sound conduit to an ear canal, and the sound guide part includes a constant diameter part whose inner diameter is constant toward one end side from the other end side.

7. The earpiece according to claim 4, wherein the inner cylinder includes a cylindrical sound guide part configured to guide sound wave from the sound conduit to an ear canal, and the sound guide part includes an expanded diameter part whose inner diameter expands toward one end side from the other end side.

8. The earpiece according to claim 5, wherein the second side surface is a straight surface, and the length between the second side surface and the boundary in a perpendicular direction of the second side surface is shorter than the length between the second side surface and the outer surface of the inner cylinder in the radial direction of the inner cylinder.

9. The earpiece according to claim 4, wherein the second side surface is an arcuate surface, and the length between the second side surface and the boundary in a normal direction of the second side surface is shorter than the length between the second side surface and the outer surface of the inner cylinder in the radial direction of the inner cylinder.

10. The earpiece according to claim 5, wherein the top surface includes a part of an outer surface of the outer cylinder.

11. The earpiece according to claim 4, wherein the groove is disposed concentrically with the inner surface of the inner cylinder.

12. An earphone comprising:

a driver unit configured to convert electrical signal into sound wave and output the sound wave;

a housing that accommodates the driver unit;

a sound conduit that projects from the housing and is configured to guide the sound wave from the driver unit to an ear canal; and an earpiece attached to the sound conduit, wherein the earpiece is an earpiece of claim 1.

13. An earphone comprising:

a driver unit configured to convert electrical signal into sound wave and output the sound wave;

a housing that accommodates the driver unit;

a sound conduit that projects from the housing and is configured to guide the sound wave from the driver unit to an ear canal; and an earpiece attached to the sound conduit, wherein the earpiece is an earpiece of claim 4.

14. The earpiece according to claim 1, wherein the other end of the expanded diameter part is disposed consecutively with one end of the constant diameter part without a step.

15. The earpiece according to claim 1, wherein the thickness of the other end of the expanded diameter part is the same as the thickness of the constant diameter part.

* * * * *